(No Model.)
H. KRAMME.
MECHANICAL MOVEMENT.
No. 597,200. Patented Jan. 11, 1898.
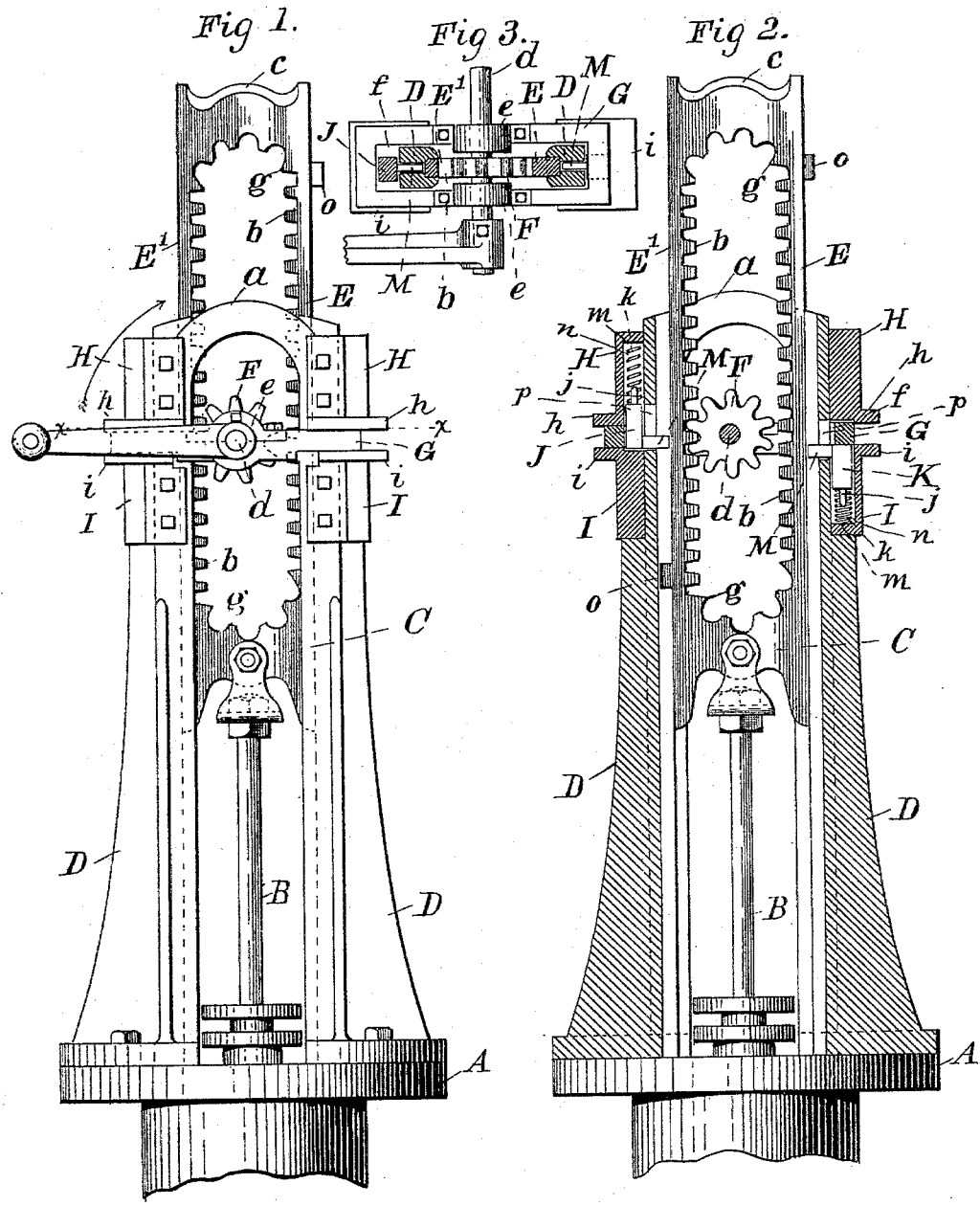
WITNESSES
Dan'l Fisher
H. Constantine
INVENTOR
Henry Kramme,
by Geo. W. T. Dinard,
atty.

UNITED STATES PATENT OFFICE.

HENRY KRAMME, OF BALTIMORE, MARYLAND.

MECHANICAL MOVEMENT.

SPECIFICATION forming part of Letters Patent No. 597,200, dated January 11, 1898.

Application filed July 10, 1897. Serial No. 644,056. (No model.)

*To all whom it may concern:*

Be it known that I, HENRY KRAMME, of the city of Baltimore and State of Maryland, have invented certain Improvements in Mechanical Movements, of which the following is a specification.

The object of this invention, in common with others of its class, is to change a rotary movement into a reciprocating one. It is herein shown and described in connection with a pump, one of the many uses to which it may be applied, the piston of which is primarily operated from a revoluble shaft through the medium of a crank or pulley.

In the description of the said invention which follows reference is made to the accompanying drawings, forming a part thereof, and in which—

Figure 1 is an exterior side elevation of the upper part of a vertical pump to which the invention is applied. Fig. 2 is a partly-sectional side view of the same. Fig. 3 is a cross-section of Fig. 1, taken on the dotted line *x x*.

Referring now to the drawings, A is the upper head of a pump, and B the piston-rod connected to the piston (not shown) and which is required to have a reciprocating movement.

C is the cross-head, to which the piston-rod is attached, and it is guided by the grooved frames D, erected on the head A, and connected at their upper end by the curved plates *a*.

Fastened to the cross-head C or forming a part thereof are two racks E and E', the teeth *b* of which face each other. The teeth of one rack are not in horizontal alinement with those of the other, the difference being one-half of the pitch of the teeth, as shown, and the racks are united at their upper end by the arched head-piece *c*, which is preferably toothed like the racks.

F is a toothed pinion arranged, as hereinafter described, to engage with either one of the racks. Its shaft *d* rests in bearing-boxes *e*, of any suitable character, bolted to a slotted yoke G, adapted to have a movement laterally of the frames D. By reference to Fig. 3 it will be seen that the yoke fits over the frames D and that the length of the slot *f* of the yoke is greater than the width across the frames, the excess in length being such as to allow of the pinion being transferred from one rack to the other. It is evident that when the pinion is engaged with the rack E' and the pinion made to revolve in the direction indicated by the curved arrow in Fig. 1 the piston-rod B will be raised, and that if the said piston is moved so as to clear the teeth of the rack E' and be brought into engagement with those of the rack E the piston-rod will be lowered, the revolution of the pinion still being in the same direction. It is to allow of this transfer of the pinion from one rack to the other that the slot *f* of the yoke G is made longer than the width across the two frames D. To effect this transfer of the pinion and the yoke in which it is supported, the lower end of the rack E' and the upper end of the rack E are each provided with a tooth *g*, which projects beyond the others, with which the teeth of the pinion will not mesh. By this means the pinion when coming in contact with either of these projecting teeth is thrown over or laterally of the space between the two racks and made to engage with the other rack. In order to enforce the lateral movement of the pinion after it is thrown over by the contact of one of its teeth with the projecting tooth of a rack, the ends of the slot formed between the two racks are provided with teeth, as shown; but these teeth are not absolutely essential to the operation of the device, as the length of the said projecting teeth may be such as to effect the entire lateral movement. It is essential, however, that the yoke should be held the entire time that the pinion is in engagement with either of the racks, and to this end the yoke is adapted to slide laterally between the flanges *h* and *i* of the upper and lower blocks H and I, which are bolted to the frames D and contain locking-bolts J and K. These bolts consist each of a square bar having a small stem *j*, over which is placed a spiral spring *k*, confined endwise between the bolt and the end *m* of a cavity *n*, formed in the blocks. The locking-bolt J rests in the cavity *n* in the block to the left, while the corresponding bolt K is in the cavity *n* in the block I to the right. The spiral spring *k* of each bolt tends to force the outer end of the square bar of the bolt between the frame D and the end of the yoke, and when so situated the yoke is locked either at one side or at the other. To move the bolts from the slot in the yoke and allow of the transfer of the yoke from one lateral position to the other, the racks are provided with fingers o in opposite positions, one being near the top of the rack E and the other near the bottom of the rack E', as shown in Fig. 2.

M M are pins on the locking-bolts, which project through slots p in the frames D, so that they may be in the path of the fingers o and be moved by them.

Supposing that the several parts of the invention are in the relative positions shown in the drawings and the crank is being turned in the direction indicated by the curved arrow, the piston-rod will be elevated by the engagement of the revolving pinion with the teeth b of the rack E' until the projecting tooth g strikes a tooth of the pinion, when that device, together with the supporting-yoke, is thrown over to the other or reverse position. This change, however, cannot take place with the locking-bolt J in the position in which it is shown. Consequently before the said projecting tooth g comes in contact with a tooth of the pinion the finger o of the rack E' strikes the pin M of the said locking-bolt and the said bolt is lifted out of the slot of the yoke, which is then free to be moved by the pinion. As soon as the yoke is moved over so that its slot is exposed to the end of the locking-bolt K, that bolt is forced by its spiral spring into the slot and the yoke is again locked, but in the new position. This second locked position is maintained until the finger o of the rack E in the downward movement of the same strikes the pin M of the locking-bolt K, when the yoke is released and is then in a condition to be moved to its original position upon the projecting tooth g of the rack E coming into contact with the pinion. From this description it will be seen that the piston-rod has now made a complete double stroke, a reciprocating movement which is derived from the rotary one of the pinion.

I claim as my invention—

In combination with two toothed racks connected substantially as described, a pinion of such diameter as to engage with only one rack at a time, a laterally-sliding yoke carrying the pinion, a projecting tooth on each rack adapted to move the pinion laterally of the racks, and locking-bolts to hold the said yoke and its pinion in either of its lateral positions, substantially as specified.

HENRY KRAMME.

Witnesses:
WM. T. HOWARD,
DANL. FISHER.